(No Model.)

F. F. MAAG.
CONNECTING ROD.

No. 537,346. Patented Apr. 9, 1895.

WITNESSES:
John A. Rennie
Fred Acker

INVENTOR
F. F. Maag
BY Munn & Co.
ATTORNEYS.

UNITED STATES PATENT OFFICE.

FERDINAND F. MAAG, OF BEAUMONT, CALIFORNIA.

CONNECTING-ROD.

SPECIFICATION forming part of Letters Patent No. 537,346, dated April 9, 1895.

Application filed August 15, 1894. Serial No. 520,408. (No model.)

*To all whom it may concern:*

Be it known that I, FERDINAND F. MAAG, of Beaumont, in the county of Riverside and State of California, have invented a new and Improved Connecting-Rod, of which the following is a full, clear, and exact description.

My invention relates to a connecting rod especially adapted for use in connection with railway switches, and the object of the invention is to provide a connecting rod capable of adjustment in a convenient and expeditious manner, whereby the throw of the switch may be readily governed, and whereby also sand and cinders will not affect the operation of the rod, means being provided for the speedy exit of any undesirable matter.

A further object of the invention is to provide a connecting rod capable of the foregoing advantages, and which will be in a measure spring-controlled and automatic in action.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in both the views.

Figure 1:
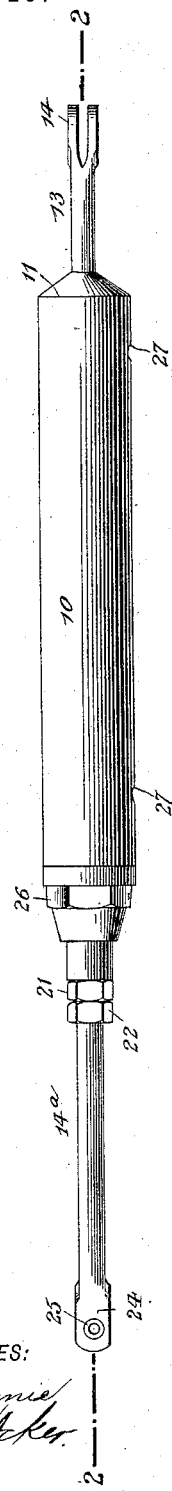
Figure 2:
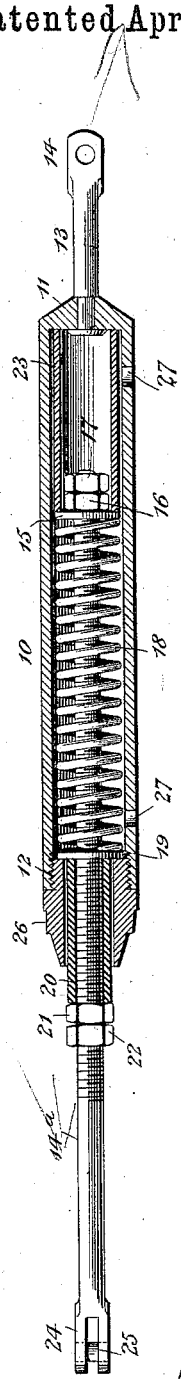

Figure 1 is a side elevation of the improved connecting rod; and Fig. 2 is a vertical longitudinal section through the same.

In carrying out the invention a casing 10 is provided, having a cap 11 at one end, the opposite end being open and provided with an interior thread 12. In the capped end of the casing a rod 13, is swiveled, or said rod may be rigidly secured if desirable, and is provided at its outer end with a recess 14, or said end may be and preferably is bifurcated. The connecting rod proper is contained within the casing, and said rod $14^a$ is provided with a thread at one end, and the exterior surface is likewise threaded near the opposite end of the rod. A washer 15, is located upon the threaded end of the rod, or that which is contained within the casing, and this end of the rod is provided with a lock nut 16 and a jam nut 17. A spring 18, is coiled around the rod, having a bearing at one end against the washer 15, and at its opposite end against a corresponding washer 19. A sleeve 20, is preferably located upon the rod, having bearing against the washer 19, and the said sleeve is adjustable with reference to the inner end of the rod through the medium of a lock nut 21 and a jam nut 22, located upon the exteriorly threaded surface of the rod near its outer end, and in this manner the tension of the spring 18 may be regulated, since said spring has bearing against the washer 15 as heretofore stated, and also against the outer washer 19.

A thimble 23 is located in the casing 10 adjacent to its capped end, having bearing against the latter, and the washer 15 is in engagement with the said thimble. The outer end of the rod $14^a$ is bifurcated, as shown at 24 in the drawings, and is provided with an inserted bearing 25, which may be made as large or as small as occasion may demand, and is adapted to receive a pivot pin whereby the connecting rod is attached to the switch, or other object in connection with which it may be used. The tension of the spring may be regulated by adjusting the nuts 16 and 17, or 21 and 22. Ordinarily the latter nuts are adjusted, but an adjustment may be made by both sets if desired.

The connecting rod and its spring are held in the casing through the medium of a locking sleeve 26, and said sleeve is preferably threaded for engagement with the interiorly threaded surface 12 of the casing, as shown in Fig. 2, and has bearing against the outer washer 19.

It will be observed that the throw of a connecting rod constructed as above described may be expeditiously and conveniently effected, and that the rod is exceedingly simple, durable and economic in its structure.

In order that cinders, dust, and other extraneous matter may escape from the casing and therefore not interfere with or clog the action of the connecting rod, openings 27 are made in the casing, as is shown in the drawings.

Having thus described my invention, I claim as new and desire to secure by Letters Patent—

1. A connecting rod, comprising a casing having a closed end from which a rod projects, a screw threaded rod projecting into the casing, washers on the rod, a spring coiled around the rod between the washers, a sleeve on the rod, and nuts on the rod for regulating the tension of the spring, substantially as described.

2. A connecting rod, comprising a casing having a rod secured to one end, a threaded rod projecting into the casing, washers on the rod, a spring coiled on the rod between the said washers, a sleeve in the casing, a second sleeve on the rod, and nuts on the said rod, substantially as described.

3. In a connecting rod for switches, the combination, with a casing having apertures formed therein for the outlet of extraneous matter, the said casing being threaded at one end and capped at the opposite end, the capped end of the casing having an extension, and a sleeve located within the casing at its capped end, of a rod entered into the casing and into the said sleeve and surrounded by a spring, a washer confining the spring and engaging with the sleeve, a lock nut and jam nut engaging with said washer, a second retaining washer engaging with the spring, a sleeve loosely mounted upon the rod and engaging with said washer, being held in place by a lock nut, and a retaining sleeve secured upon the casing and engaging with the outermost washer of the said rod, substantially as shown and described.

4. In a connecting rod for switches, the combination, with a casing having apertures formed therein for the outlet of extraneous matter, said casing being threaded at one end and capped at the opposite end, the capped end of the casing having an extension, and a sleeve located within the casing at its capped end, of a rod entered into the casing and into the said sleeve and surrounded by a spring, a washer confining the spring and engaging with the sleeve, a lock nut and jam nut engaging with said washer, a second retaining washer engaging with the spring, a sleeve loosely mounted upon the rod and engaging with said washer, being held in place by a lock nut, a retaining sleeve screwed upon the casing and engaging with the outermost washer of the said rod, jaws formed upon the outer end of the said rod, and a bearing removably located within the said jaws, substantially as and for the purpose set forth.

FERDINAND F. MAAG.

Witnesses:
  GEO. E. BRIDGES,
  H. R. KETCHUM.